(12) United States Patent
Kim

(10) Patent No.: US 6,215,791 B1
(45) Date of Patent: Apr. 10, 2001

(54) QUEUE MANAGEMENT SYSTEM CAPABLE OF CONTROLLING PRIORITY AND JITTER

(75) Inventor: Deog-Nyoun Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/066,952

(22) Filed: Apr. 28, 1998

(30) Foreign Application Priority Data

Apr. 30, 1997 (KR) .................................. 97-16786

(51) Int. Cl.[7] .............................. H04L 12/56; H04J 3/06
(52) U.S. Cl. ........................................... 370/412; 370/516
(58) Field of Search .................................. 370/516, 412, 370/413, 414, 417, 416, 389, 392, 393, 394, 292, 230, 252, 395, 429

(56) References Cited

U.S. PATENT DOCUMENTS

| | | | |
|---|---|---|---|
| 5,287,347 | * | 2/1994 | Spanke ................................... 370/60 |
| 5,541,926 | * | 7/1996 | Saito et al. ........................... 370/94.2 |
| 5,793,747 | * | 8/1998 | Kline ...................................... 370/230 |
| 6,058,114 | * | 5/2000 | Sethuram et al. .................... 370/397 |

FOREIGN PATENT DOCUMENTS 2321570 7/1998 (GB) .
2322258 8/1998 (GB) .

* cited by examiner

Primary Examiner—Hassan Kizou
Assistant Examiner—Duc Ho
(74) Attorney, Agent, or Firm—Pennie & Edmonds LLP

(57) ABSTRACT

A queue management system for selectively transmitting cells received from a plurality of sources, comprises: a multiplexer for multiplexing the cells from the plurality of sources into one output line; a cell pool for storing the cells received from the multiplexer; an idle-address FIFO for storing addresses of empty sectors of the cell pool; a sequencer, having a plurality of modules therein, each module for determining the cells' sequence of transmission, for storing information including a cell's priority field and its corresponding address in the cell pool, comparing the stored information with information of a new entry cell, and queuing the information on the basis of the priority field, wherein the priority field is composed of a deadline time and an eligible time, the deadline time being defined as a maximum allowable delay bound at a node and the eligible time, referring to a delay bound in which a cell is supposed to be transmitted from the node; and a write controller and a read controller for generating signals for accessing to the multiplexer, the cell pool and the sequencer.

11 Claims, 7 Drawing Sheets

FIG. 4A
(PRIOR ART)

| $P_z$ | $P_y$ | .... | $P_{n+1}$ | $P_{n+1}$ | $P_n$ | $P_n$ | .... | |
|---|---|---|---|---|---|---|---|---|
| $A_z$ | $A_y$ | | $A_m$ | $A_l$ | $A_k$ | $A_j$ | | |

FIG. 4B
(PRIOR ART)

| $P_y$ | .... | $P_{n+1}$ | $P_{n+1}$ | $P_n$ | $P_n$ | $P_n$ | .... | |
|---|---|---|---|---|---|---|---|---|
| $A_y$ | | $A_m$ | $A_l$ | $A_n$ | $A_k$ | $A_j$ | | |

QUEUE MANAGEMENT SYSTEM CAPABLE OF CONTROLLING PRIORITY AND JITTER

FIELD OF THE INVENTION

The present invention relates to a queue management system; and, more particularly, to a queue management system capable of controlling jitter as well as cell priority.

BACKGROUND OF THE INVENTION

A broadband integrated service digital network (B-ISDN) provides an end-to-end transport for a broad spectrum of services flexibly and efficiently via an asynchronous transfer mode (ATM) technique. In the ATM, information is packetized and carried in fixed length "cells". Each cell comprises of 53 octets consisting a 5-octet header and a 48-octet information field.

Among the broad spectrum of services, real-time communication services have become a necessity in the B-ISDN. Various QoSs (quality of services) including a receipt rate, a cell loss rate, a delay and a jitter are defined according to requests from various clients for the real time communication services, and, therefore, the B-ISDN network is expected to guarantee these QoS's. Particularly in the real-time communication services, the delay and the jitter exceeding certain bounds are treated as equivalent to a cell loss, and therefore, an appropriate queue management scheme for restraining the delay and the jitter becomes an important issue, wherein the jitter of a connection, also known as a cell delay variation, may be defined in terms of a maximum absolute difference in the delays experienced by any two cells on that connection.

Conventional queue management schemes may be broadly categorized into: work-conserving schemes and non-work-conserving schemes.

In the work-conserving schemes, a server always works as long as a queue holds cells; while, in the non-work-conserving schemes, the server does not always work even if there is a cell in the queue. Since an average receipt rate and an average delay have been regarded relatively important factors for the QoS's, the work-conserving scheme has been preferred. On the other hand, as importance on the cell delay and the jitter grows, the non-work-conserving scheme becomes more important.

The non-work-conserving scheme is inferior in terms of efficiency of the queue to the work-conserving scheme; however, it can significantly reduce burstiness of cell sequence, or simply, the jitter.

A queue management system according to the work-conserving scheme is proposed by Chao (see "A novel architecture for queue management in the ATM network", *IEEE Journal on Selected Areas in Communications*, 9, No. 7, September, 1991). The system proposed by Chao will now be described with FIGS. 1A to 5.

FIG. 1 exemplifies reference to how the departure sequence numbers can be used in rearranging cells in order to prevent burstiness.

For the sake of discussion, it is assumed that input X's average arrival rate (AR) is 0.1 cell per time slot and the mean burst length B is 2; and input Y's AR is 0.2 cell per time slot and B is 4. Initially, the real time is reset to zero. Immediately following the resetting, four consecutive cells arrive from input Y, and then two consecutive cells arrive from input X as shown in FIG. 1A. A $DS_i$, a departure sequence number (DS) of an i-th arrived cell, is assigned to each cell as depicted below. The $DS_i$, e.g., $DS_1$, the DS of the first cell from the Y input, is assigned the real time's value (zero). The next cell is assigned a number according to the formula, $DS_i$=maximum {real time, $DS_{i-1}+1/ARi$}. Consequently, the cells that follow are assigned 5, 10 and 15, respectively. When a first cell of the X input arrives, the real time value is 4, which is then assigned to the cell. For a second cell of the input X, its DS is set to maximum {5, 4+10} or 14. As shown in FIG. 1B, cells are arranged in a queue 11. Based on these DS values, a server 12 will sequentially transmit cells with smaller values first, as shown in FIG. 1C.

For a queue management in an ATM switch, additional data is attached to the cell, which comprises an output port address and a priority field.

A packet including the priority field, which is routed in the B-ISDN, can be arranged like the one shown in FIG. 2. The priority field consists of a service class and a departure sequence number. Both the output port address and the priority field in the packet could be assigned by an input port controller of the ATM switch.

A conventional queue management architecture proposed by Chao is illustrated in FIG. 3. The conventional queue management architecture comprises a time division multiplexer (TDM) 31, a cell pool 32, a sequencer 33, an idle-address FIFO 34, a write controller 35 and a read controller 36.

The TDM 31 multiplexes twelve inputs into one higher-speed channel. The cell pool 32 is made of memory storing cells from the TDM 31. The sequencer 33, a sorting memory, stores a pair of a packet's priority field and its corresponding address, the pair being denoted as P-A, wherein the address refers to a vacant section in the cell pool 32, information on what is received from the idle-address FIFO 34. The idle-address FIFO 34 stores addresses of all empty cells in the cell pool 32. The write controller 35 and the read controller 36 generate proper control signals for all other functional blocks.

Packets from twelve inputs are time division multiplexed into one channel in the time division multiplexer (TDM) 31 and the cells in the packets are written into a cell pool 32.

The P-A's are stored in the sequencer 33 in such a way that higher priority pairs are always at the right side of lower priority ones so that they will be accessed sooner by a read controller 36. Once the pairs have been accessed, the address in the cell is used to read out a corresponding section in the cell pool 32.

The concept of implementing the sequencer 33 will now be illustrated with reference to FIGS. 4A and 4B.

It is assumed that a value of $P_n$ is less than that of $P_{n+1}$, and thus, has a higher priority. When a new cell with priority $P_n$ and the address An arrives, all pairs on the right of $A_k$, including $A_k$ itself, remain at their positions while others are shifted to the left; the vacant position will be replaced with the pair comprised of the new cell's priority field ($P_n$) and address ($A_n$) as shown in FIG. 4B.

If the cell pool 32 is full (i.e., the idle-address FIFO 34 is empty), the priority field at the left-most position of the sequencer (e.g., $P_z$) will be compared with that of the newly arrived cell ($P_n$). If $P_n$ is smaller than $P_z$, the pair of $P_z$ and $A_z$ will be pushed out from the sequencer 33 as the new pair $P_n$-$A_n$ is inserted in the sequencer 33. Meanwhile, the cell with address $A_z$ in the cell pool 32 will be overwritten with the new cell. However, if $P_n$ is larger than or equal to $P_z$, the new cell will be discarded instead.

FIG. 5 depicts a detailed structure of the sequencer 33 that processes the P-A pair. A module of a circuit in a box 50 is repeated side-by-side.

The new priority and address pair, $P_n$-$A_n$, is broadcast to every module. Based on the priority values of X, Y and Z, where X=$P_{i-1}$, Y=$P_i$, and Z=$P_n$, a decision circuit 51 will generate proper signals, sn and sl, to shift the new pair $P_n$-$A_n$ into a register 55 in the box 50, shift the pair $P_{i-1}A_{i-1}$ from the right to the register 55, or obtain the original value $P_i$-$A_i$. Table 1 shows a truth table generating the sn and sl signals. For case (a) in Table 1, where the new pair $P_n$-$A_n$ is to be latched in the register 55, both the sn and sl signals are asserted to select the $P_n$-$A_n$ for inputs to the register 55 and pass a shift-left-clock (slck) signal to the register's clock input. For case (b) in Table 1, only the sl signal is asserted, which results in the $P_{i-1}$-$A_{i-1}$ being selected and latched into the register 55 with the clock signal slck. For case (c) in Table 1, the sl signal is deserted while the sn is "do not care"; thus, the register 55 retains its original value $P_i$-$A_i$.

The decision circuit 51 compares the X, Y and Z concurrently. If the decision circuit 51 yields a shift-left signal (sl) with a value of 1, and a store-new signal (sn) with a value of 1, a multiplexer 54 outputs the P-A pair of the newly received cell and the register 55 stores the P-A pair. In this event, a shift-right signal (sr) and a shift-right clock (srck) are blocked.

TABLE 1

| Case | sn | sl | Action |
| --- | --- | --- | --- |
| (a) X≦Z<Y | 1 | 1 | Latch $P_n$ - $A_n$ in the register |
| (b) Z<X≦Y | 0 | 1 | Latch $P_{i-1}$ - $A_{i-1}$ in the register |
| (c) X≦Y≦Z | d | 0 | Retain $P_i$ - $A_i$ in the register |

A detailed operation of the sequencer 33 is illustrated with reference to Table 2.

TABLE 2

| sl | sn | sr | Multiplexer Output | Action |
| --- | --- | --- | --- | --- |
| 0 | — | — | — | Retain $P_i$ |
| 1 | 1 | 0 | $P_n$ | Insert |
| 1 | 0 | 0 | $P_{i-1}$ | Shift left |
| — | — | 1 | $P_{i+1}$ | Shift right |

If the decision circuit 51 outputs the sl of value 0, the current P-A pair is maintained. In this event, the sr and the srck are blocked.

After sorting the newly received cells, the read controller 36 outputs the rightmost P-A pair to the server 12 by shifting right the P-A pairs in the sequencer 33 by using the srck after setting the sr to 1.

The idle-address FIFO 34 stores the address of the cell transported to the server 12. If a new cell is received, the idle-address FIFO 34 outputs an address.

The write controller 35 lets the TDM output a cell by asserting a select signal and issues a read signal (rd) to let the idle-address FIFO 34 output an address (add). If a P-A pair is accepted by the sequencer 33, the write controller 35 issues a write control signal (waddr), and also issues the sr and the slck.

The read controller 36 produces a shiftout signal, the shiftout signal being used in outputting the address of the highest-priority cell; produces a write signal (wr) to store the corresponding address in the idle-address FIFO 34; and produces read control signal (raddr) for the cell pool to output a cell in the corresponding address. The read controller 36 also produces the sr and the srck.

The whole operation of the conventional queue management architecture will now be described.

Cells from various connections arrive in the cell pool 32 after being multiplexed in the TDM 31. The address of the cell stored in the cell pool 32 is from the idle-address FIFO 34 activated with the rd issued at the write controller 35. The P-A pair made up of the address and the priority information is stored in the sequencer 33 with the assertion of the shiftin signal.

A relative position of the P-A pairs is determined by the priority so that a P-A pair with a higher priority is placed to the right side of a P-A pair with a lower priority. The cell associated with the right-most pair is outputted to the server 12 in response to the shiftout signal.

The number of the modules in the sequencer 33 strictly matches the number of the cells storable in the cell pool 32. Accordingly, when the cell pool 32 is full, which also suggests that the idle-address FIFO 34 is empty, the cell pool 32 has no more space for storing a new cell. If a new cell is received while the cell pool 32 is full, first, the priority of the newly received cell is compared with the priority of the left-most cell. If the priority of the left-most cell is lower than that of the newly received cell, the former will be discarded and a pair of a newly generated idle address as a result of discarding the former, and the priority of the newly received cell is inserted in the sequencer 33. And, if otherwise, the latter will be discarded.

As described above, the aforementioned sequencer 33 is capable of transporting received cells to the server 12 in conformity to the priority included in a cell header, in other words, has a scheduling function. The sequencer 33, however, does not have any capability of providing a delay in the queue 11; and is not capable of performing any jitter-controlling function.

In contrast, the non-work-conserving scheme does provide the jitter-controlling function in managing the queue. Nevertheless, the non-work-conserving scheme has conventionally been implemented solely with software, which exacts too much calculation time.

SUMMARY OF THE INVENTION

It is, therefore, a primary object of the present invention to provide an apparatus with a queue management system capable of controlling jitter as well as cell priority.

In accordance with the present invention, there is provided a queue management system for selectively transmitting cells received from a plurality of sources, the system comprising: a multiplexer for multiplexing the cells from the plurality of sources into one output line; a cell pool for storing the cells received from the multiplexer; an idle-address FIFO for storing addresses of empty sectors of the cell pool; a sequencer, having a plurality of modules therein, each module for determining the cells' sequence of transmission, for storing information including a cell's priority field and its corresponding address in the cell pool, comparing the stored information with information of a new entry cell, and queuing the information on the basis of the priority field, wherein the priority field is composed of a deadline time and an eligible time, the deadline time being defined as a maximum allowable delay bound at a node and the eligible time, referring to a delay bound in which a cell is supposed to be transmitted from the node, being determined by taking into account a jitter; and a write controller and a read controller for generating signals for accessing to the multiplexer, the cell pool and the sequencer.

BRIEF DESCRIPTION OF THE DRAWINGS

The above and other objects and features of the present invention will become apparent from the following description of preferred embodiments given with reference to the accompanying drawings, in which:

FIGS. 4A and 4B illustrate a concept of implementing the sequencer shown in FIG. 3;

DETAILED DESCRIPTION OF THE PREFERRED EMBODIMENT

A preferred embodiment in accordance with the present invention will now be described in detail with reference to FIGS. 6 and 7.

Figure 6:
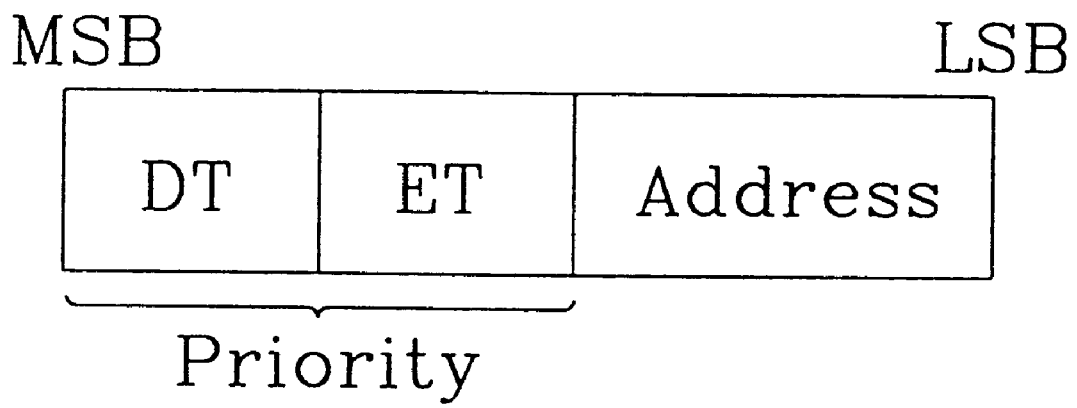
FIG. 6 depicts a priority-and-address pair in accordance with the present invention.

FIG. 6 illustrates a priority-address pair in accordance with the present invention. A priority field bisects itself into areas for a deadline time and for an eligible time, respectively. The deadline time can be defined as a maximum allowable delay bound at a node in a broadband integrated service digital network (B-ISDN). The deadline time at a node is determined on condition that the sum of all the deadline times cannot exceed a source-to-destination delay bound. If a cell under transmission exceeds the deadline time at a node, the end-to-end bound may not be kept, thereby the cell being regarded as useless. The eligible time refers to a delay bound in which a cell is supposed to be transmitted from a node, being determined by taking account of a jitter. It is defined by a following mathematical formula.
[Mathematical Formula]

$$ET_{i,j}^k = ET_{i-1,j}^k + d_{i-1,j} + t_i,$$

wherein, the $ET_{i,j}^k$ denotes an eligible time assigned to a cell k for a channel j at a node i; the $ET_{i-1,j}^k$ denotes an eligible time assigned to the cell k for the channel j at a node i-1; the $d_{i-1,j}$ represents a deadline time for the channel j at the node i-1; and the $t_i$ refers to a propagation delay between the node i-1 and the node i. The above formula represents that the eligible time of cell k at node i depends on the eligible time and the deadline time of the previous node i-1.

Figure 1A:
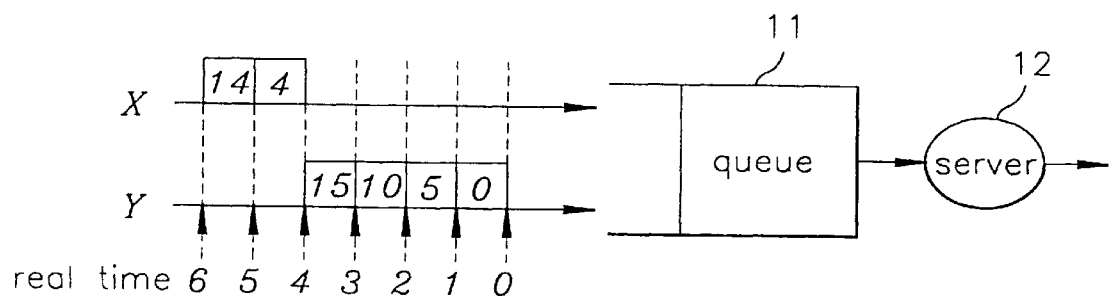
FIGS. 1A to 1C show an example of how the departure sequence number can be used to protect the short-burst cells from being mistreated.
Figure 1B:
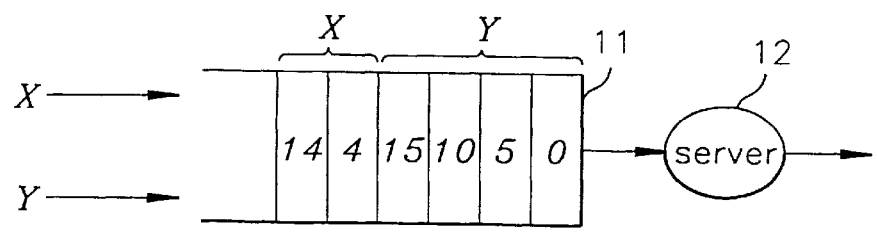
Figure 1C:
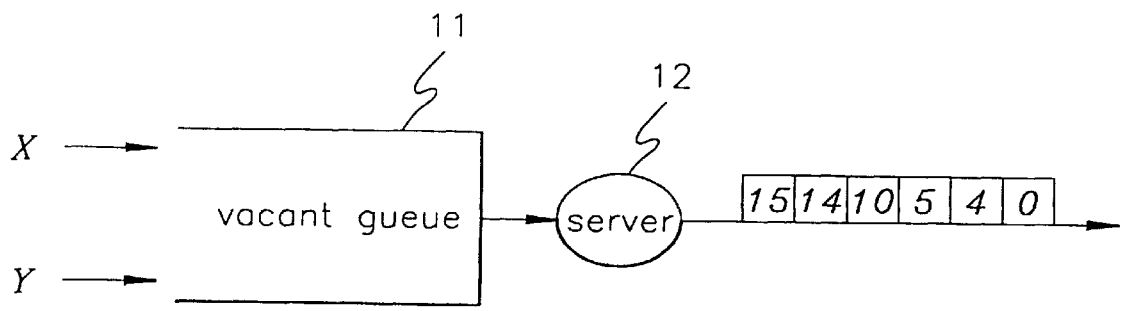
Figure 2:
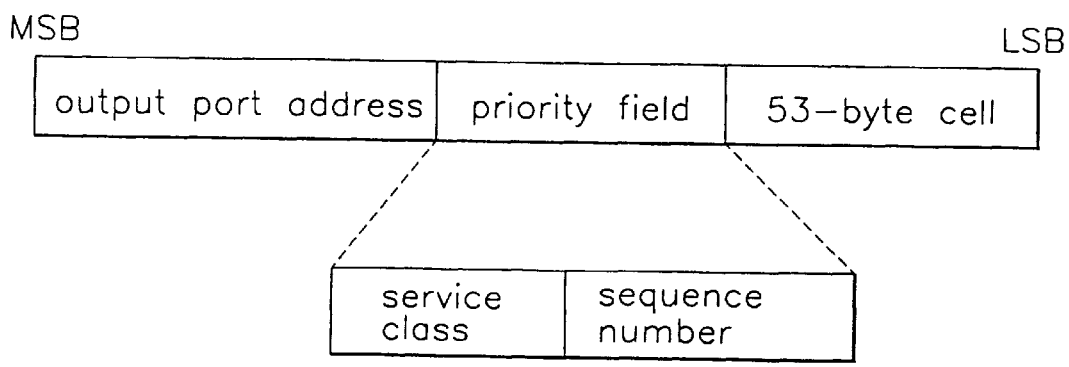
FIG. 2 presents an exemplary arrangement of a priority field in a cell.
Figure 3:
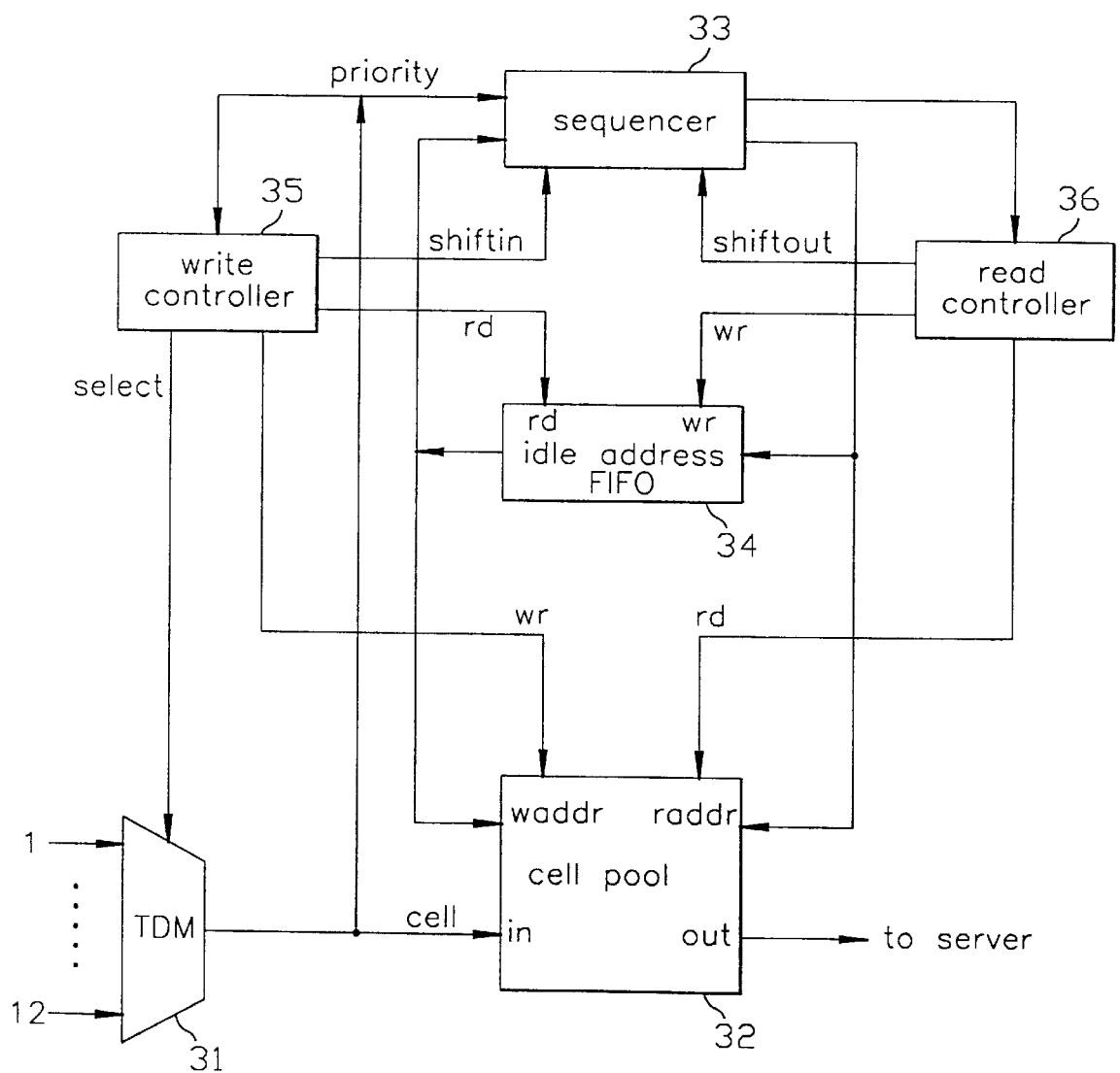
FIG. 3 describes a conventional queue management architecture.
Figure 5:
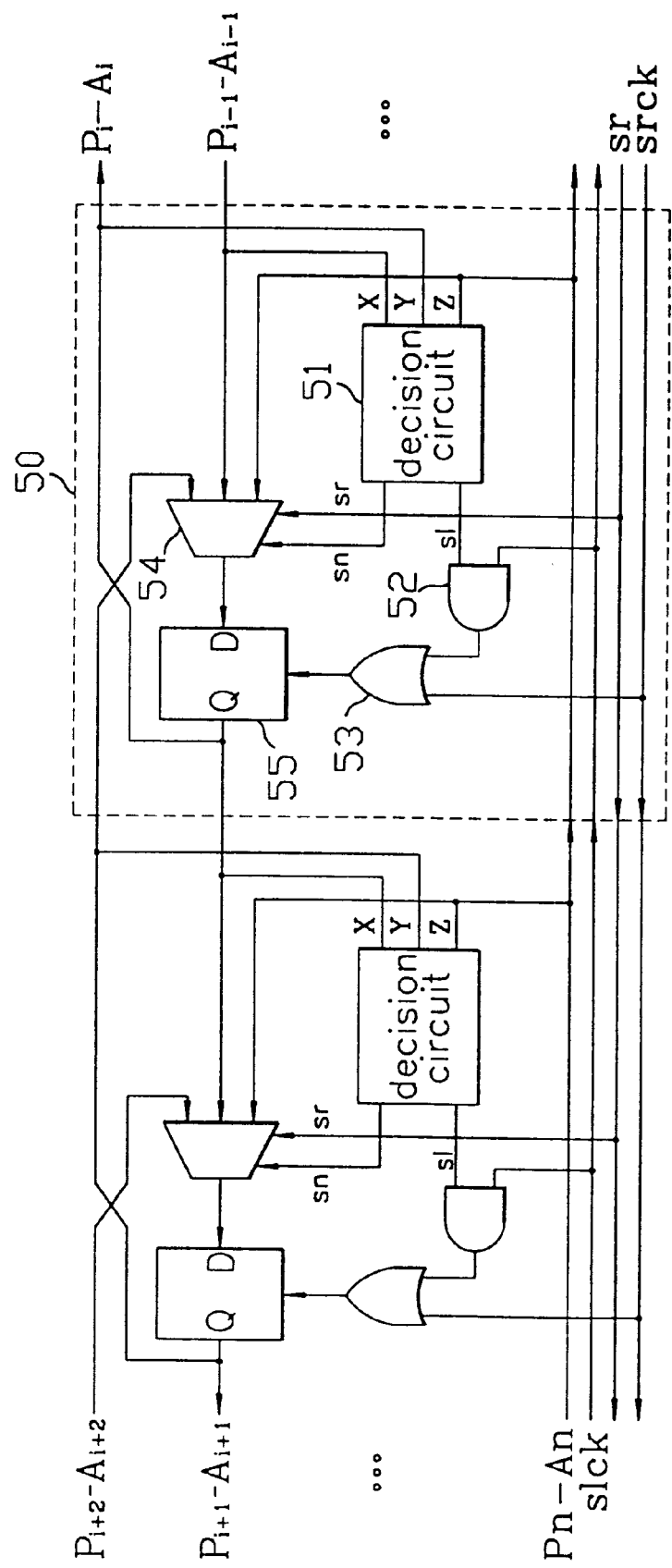
FIG. 5 details the structure of the sequencer shown in FIG. 3.

A queue management system in accordance with the present invention handling the above described priority-and-address pair can be implemented with a system, which has substantially same contour as the prior art system. Accordingly, the inventive structures and operations of a TDM 31, a cell pool 32, an idle-address FIFO 34, a write controller 35 and a read controller 36 in the present invention are identical to those of the blocks with same numerals in the prior art system in FIG. 3.

Figure 7:
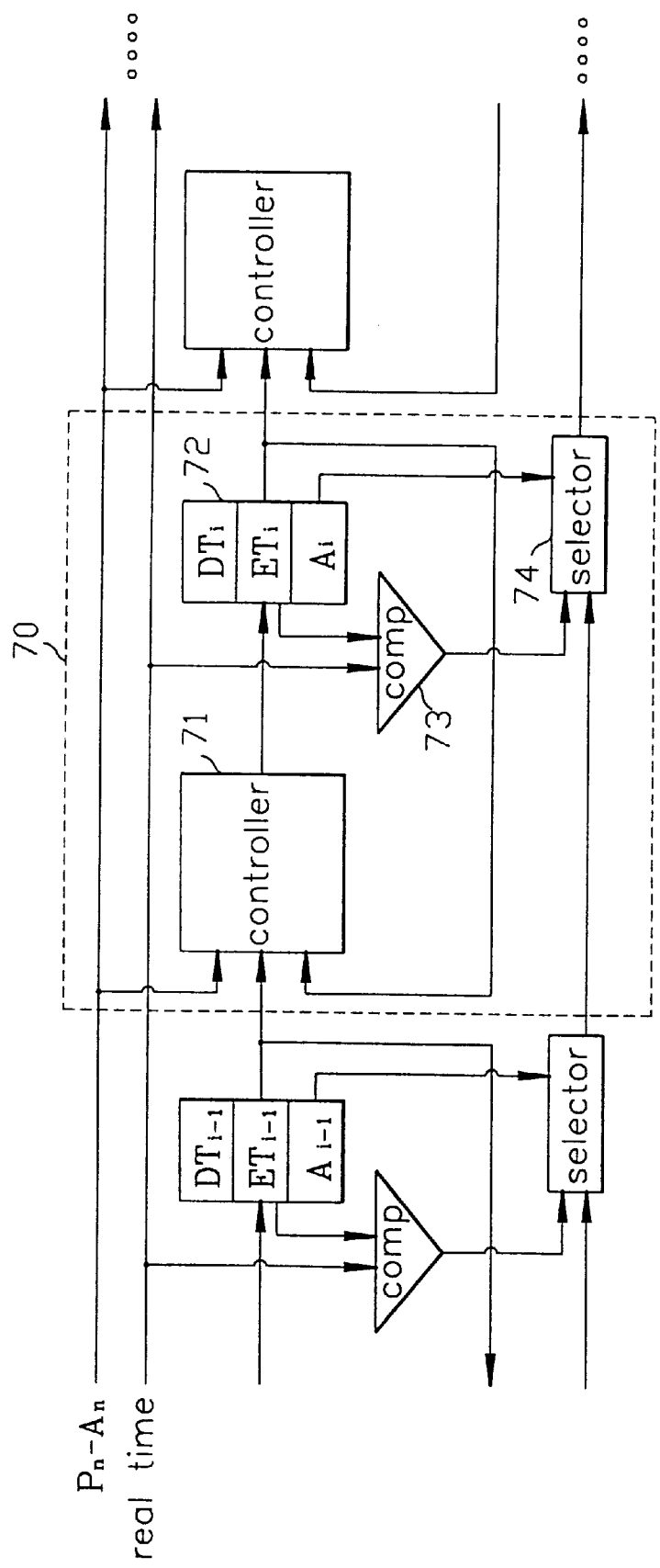
FIG. 7 provides detailed building blocks of an inventive sequencer capable of a jitter control.

FIG. 7 describes detailed building blocks of an inventive sequencer capable of controlling the jitter.

In the inventive sequencer, a module 70 is repeated side-by-side. The number of modules incorporated in the inventive sequencer is equal to the number of cells being storable in the cell pool 32. Each module 70 includes a controller 71, a register 72, a comparator 73 and a selector 74.

The priority field including the eligible time and the deadline time is stored in the register 72. Addresses in the cell pool 32 are also stored in the register 72, wherein each address designates a section in the cell pool 32 in which a cell associated with the priority field is stored. A real time and the eligible time are asserted to the comparator 73. The selector 74 selectively yields one between an output from a left-hand side selector and the address in the register 72. The controller 71 compares the priority field of the corresponding module 70 with that of a left-hand module denoted by a subscript i−1, and also with that of a new entry. Then, the controller 71 chooses a priority-and address pair as a result of the comparison, and finally let the register 72 store the chosen priority-and-address pair.

The sequencer in accordance with the present invention sequentially compares first the deadline time of a new entry with that of the entries the sequencer has been keeping. An entry with smaller value of the deadline time is arranged right-side of an entry with larger deadline time. In case that the deadline times are same, the eligible times are compared, and then, an entry with a smaller value of the eligible time is arranged to be at the right-side than an entry with larger eligible time.

In contrast to the conventional queue management system, the inventive queue management system provides a priority based not only on the deadline time but also on the eligible time. More specifically, after the real time and the eligible time in each module are compared, a cell having the eligible time smaller than the real time is served first. Among the cells with eligible time smaller than the real time, a cell with a smaller eligible time is served first.

The comparator 73 compares the real time with the eligible time stored in the register 72. If the eligible time $ET_i$ of a cell is larger than the real time, i.e., if the cell arrives earlier than the eligible time, the selector 74 selects the output of the left-hand selector; but if the eligible time is smaller than the real time, the selector 74 selects the address $A_i$, stored in the register 72.

The queue management system in accordance with the present invention is designed such that even a cell with high priority resulted from a small value of the deadline time is not supposed to be served until the arrival of the eligible time. Consequently, any cell is not allowed to be served until the arrival of the eligible time, which, in turn, makes a significant contribution in controlling the jitter.

While the present invention has been described with respect to the preferred embodiments, other modifications and variations may be made without departing from the scope and spirit of the present invention as set forth in the following claims.

What is claimed is:

1. A queue management system for selectively transmitting cells received from a plurality of sources, the system comprising:

a multiplexer for multiplexing the cells from the plurality of sources into one output line;

a cell pool for storing the cells received from the multiplexer;

an idle-address FIFO for storing addresses of empty sectors of the cell pool;

a sequencer, having a plurality of modules therein, each module for determining the cells' sequence of transmission, for storing information including a cell's priority field and its corresponding address in the cell pool, comparing the stored information with information of a new entry cell, and queuing the information on the basis of the priority field, wherein the priority field is composed of a deadline time and an eligible time, the deadline time being defined as a maximum allowable delay bound at a node and the eligible time, referring to a delay bound in which a cell is supposed to be transmitted from the node, being determined by taking into account a jitter; and a write controller and a read controller for generating signals for accessing to the multiplexer, the cell pool and the sequencer, wherein the eligible time is represented by:

$$ET_{i,j}^k = ET_{i-1,j}^k + d_{i-1,j} + t_i,$$

wherein $ET_{i,j}^k$ denotes the eligible time assigned to a cell k for a channel j at a node i; $ET_{i-1,j}^k$ denotes the eligible time assigned to the cell k for the channel j at a node i−1; $d_{i-1,j}$ represents a deadline time for the channel j at the node i−1; and $t_i$ refers to a propagation delay between the node i−1 and the node i.

2. The queue management system of claim 1, wherein the sequencer includes a plurality of modules repeated side by side, the module containing:

a register for storing the information including the priority field and its corresponding address;

a comparator for comparing a real time with the eligible time stored in the register;

a selector for selectively yielding either an output from a selector of the left-hand module or an address of the register according to an output from the comparator; and a controller for comparing the priority field of a corresponding module with that of the new entry cell and that of a left-hand module, choosing a priority-address pair according to the result of the comparison, and letting the register store the priority-address pair.

3. The queue management system of claim 2, wherein the controller compares the deadline time of the new entry cell with that of the entries stored in the sequencer, and an entry with a smaller value of the deadline time is arranged to be at the right side to an entry with a larger deadline time; and, further, if values of deadline time of the new entry cell with that of the entries stored in the sequencer are identical to each other, the controller compares the eligible time of the new entry cell with that of the entries stored in the sequencer so as to have an entry with a smaller value of the eligible time located to the right side of an entry with a larger eligible time.

4. The queue management system of claim 2, wherein the number of modules incorporated in the sequencer is equal to the number of cells storable in the cell pool.

5. The queue management system of claim 2, wherein the sequencer is used for a non-work-conserving queue management scheme.

6. The queue management system of claim 5, wherein the queue management system is implemented in a node incorporated in a broadband integrated service digital network.

7. The queue management system of claim 6, wherein the node is an asynchronous transfer mode switch.

8. A queue management method, for use in selectively transmitting cells received from a plurality of sources, for queuing received cells in an order that a cell with a higher priority is arranged to be transmitted first, by using priority information composed of a deadline time and an eligible time, the deadline time being defined as a maximum allowable delay bound at a node and the eligible time referring to a delay bound in which a cell is supposed to be transmitted from a node, being determined by taking into account a jitter, wherein the eligible time is represented by:

$$ET_{i,j}^k = ET_{i-1,j}^k + d_{i-1,j} + t_i,$$

wherein $ET_{i,j}^k$ denotes the eligible time assigned to a cell k for a channel j at a node i; $ET_{i-1,j}^k$ denotes the eligible time assigned to the cell k for the channel j at a node i−1; $d_{i-1,j}$ represents a deadline time for the channel j at the node i−1; and $t_i$ refers to a propagation delay between the node i−1 and the node i.

9. The method of claim 8, wherein the method sequencer is applied for a non-work-conserving queue management scheme.

10. The method of claim 9, wherein the queue management system is implemented in a node incorporated in a broadband integrated service digital network.

11. The method of claim 10, wherein the node is an asynchronous transfer mode switch.

\* \* \* \* \*